(No Model.)
S. L. REEFY.
BRACKET LAMP FOR VEHICLES.
No. 475,798.     Patented May 31, 1892.
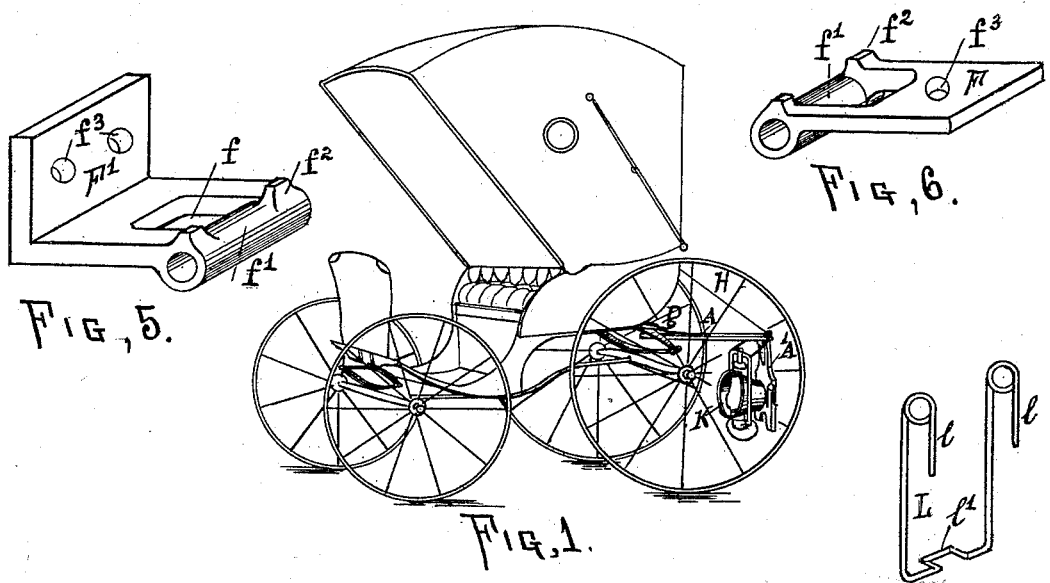
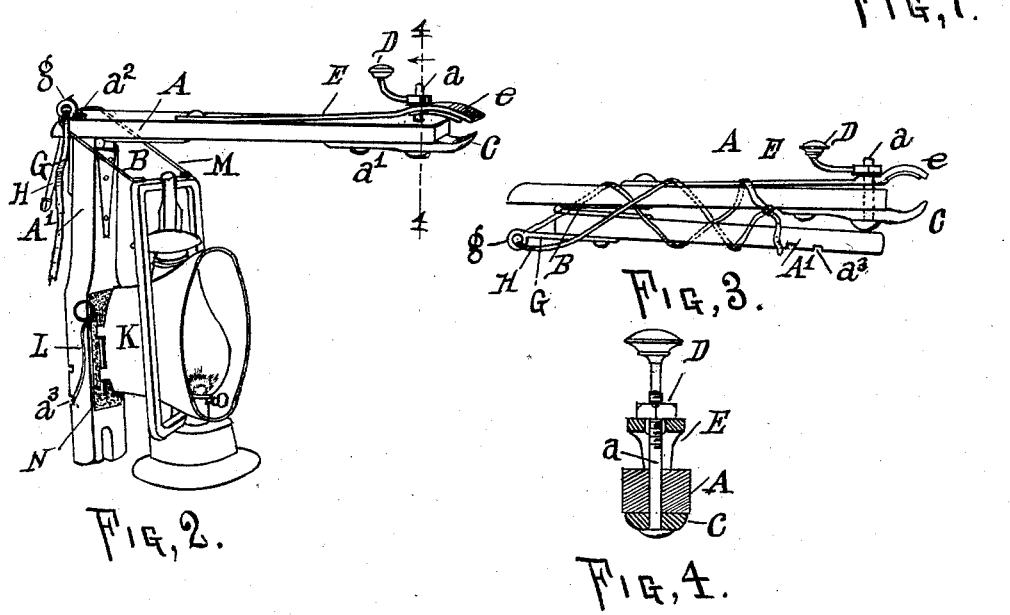

UNITED STATES PATENT OFFICE.

SOLOMON L. REEFY, OF EDINBURG, ILLINOIS.

BRACKET-LAMP FOR VEHICLES.

SPECIFICATION forming part of Letters Patent No. 475,798, dated May 31, 1892.

Application filed November 20, 1891. Serial No. 412,587. (No model.)

*To all whom it may concern:*

Be it known that I, SOLOMON L. REEFY, a citizen of the United States, residing at Edinburg, in the county of Christian and State of Illinois, have invented a new and useful Bracket-Lamp for Vehicles, of which the following is such a full, clear, and exact description as will enable those skilled in the art to make and use the same.

The purpose of my invention is to provide a lamp-bracket for vehicles so constructed as to be inexpensive, light, and serviceable, easily attachable to or detachable from the vehicle, adapted to fold up so as to be conveniently carried or stowed away when not in use, and adapted to be used with lanterns of ordinary construction.

My invention is fully shown in the annexed drawings, in which—

Figure 1 is a view of the bracket-lamp attached to the vehicle. Fig. 2 is an enlarged detached view of the bracket extended showing the lantern in position thereon. Fig. 3 is an enlarged detached view of the bracket folded, the lantern being detached. Fig. 4 is an enlarged transverse section on the line 4 of Fig. 2. Fig. 5 is an enlarged detached view of the hanger by means of which the bracket is attached to the back of the vehicle-body. Fig. 6 is an enlarged detached view of the hanger by means of which the bracket is attached to the back spring-bar of the vehicle. Fig. 7 is a enlarged detached view of the spring by means of which the lantern is connected with the bracket.

Similar letters indicate similar parts in all the views.

In the drawings I have shown only so much of the vehicle as is necessary to illustrate the connection of the bracket with the vehicle.

The main frame of the bracket is preferably of hard wood, though other material may be used. I have shown a hooded tubular lantern as applied to the bracket; but a lantern of any other suitable form may be used. The horizontal arm A is connected with the vertical arm A' by means of a hinge B, suitably secured to the arms at their angle in such manner that when extended the horizontal arm will rest on the upper end of the vertical arm. To one end of the arm A, the jaw C is secured, preferably by means of a bolt $a$ and a rivet $a'$. The spring-bar E is parallel to the arm A and has one end secured to the arm. The other end of the spring-bar is provided with a curved jaw $e$. The bolt $a$ passes through a hole in the saw $e$ and has on its projecting end a nut D, by means of which the jaw $e$ may be closed to clamp the bracket on the axle of the vehicle or on the hanger which connects the bracket with the vehicle. To the upper end of the arm A' the bar G is secured in any suitable manner. This bar has an annular head $g$, which projects upward through a slot in the hinged end of the arm A and is provided with a strap H, by means of which that end of the bracket is supported on and adjusted to the vehicle. When the arms are extended, the rod G extends upward through the slot in the arm A, and the bail M, resting on the arm A and under the head $g$, prevents the arms from turning on the hinge. When the bail is removed, the arms are free to turn on the hinge, and in turning the rod moves out of the slot. Near the lower end of the bar A' are notches $a^3$, which form the seat for the spring L.

From the foregoing description it is obvious that the arms A and A' may turn on the hinge B and fold up so as to lie parallel to each other in convenient form for transportation. (See Fig. 3.)

The lantern K is of ordinary construction and need not be described here further than to say that it is provided with a large bail M, through which the arm A' may pass freely. When the bracket is extended, this bail rests on the slotted end of the arm A and fits snugly under the annular head $g$, thereby holding and steadying the arms in their extended position. The spring L is formed of a single rod, has downwardly-extending ends $l$, which are suitably secured to the back of the lantern, and has its central part bent to form a handle $l'$, by means of which the spring may be readily manipulated. That part of the arm A' behind the lantern is provided with a cushion N, of yielding material, which serves to prevent rattling, and also to prevent injury to the lamp by concussion.

Hangers of any suitable construction may be used to connect the bracket with the vehicle, and in some cases the bracket may be clamped directly on the axle of the vehicle— as, for instance, where the bracket is applied to a road-cart. I prefer, however, to use hangers of the forms shown in Figs. 5 and 6. The hanger F (shown in Fig. 5) consists of a plate having a central opening $f$ and having at one end an integral tube $f'$, provided with projections $f^2$ on its under side. Near the other end of the plate is a hole $f^3$, through which a bolt passes to secure the plate at the center and to the under side of the upper half of the elliptical vehicle-spring. The bolt passing through the plate, the spring, and the spring-bar securely clamps them together. When the bracket is in place, the jaws $e$ C inclose the tube $f'$, the projections $f^2$ prevent the jaws from slipping off sidewise, and the opening $f$ permits the jaws to turn on the tube when the bracket is raised to pass an obstruction or for any other purpose. The hanger F' (shown in Fig. 6) is of the same general structure, except that it is in the form of an angle-plate and is provided near its upper end with holes $f^3$ to receive screws by means of which the plate is secured to the center of the rear end of the vehicle-body near its lower edge. To place the lantern on the bracket, the arm A' is inserted through the bail M and through the loop of the spring L. The bail is hung on the slotted end of the arm A and pushed securely under the head $g$ of the rod G, and the spring L is pressed into one of the notches $a^3$, thereby holding the lantern securely in position. To attach the bracket to the vehicle, one of the hangers—F, for example—is secured to the vehicle, as already described. The jaws C $e$ are then lightly clamped on the tube $f$, so that the jaws may turn on the tube, as described. One end of the strap H is secured to the head $g$ and the other end of the strap is connected with the vehicle at any convenient point, preferably to the seat-rail or the back of the seat, so as to hold the bracket in the desired position. It is convenient to have the strap within easy reach of the driver, so that he may by pulling on the strap lift the bracket to pass obstructions. To remove the lantern or the bracket, the operations which I have describe are reversed. When not in use, the bracket is folded up, as shown in Fig. 3, and may be conveniently carried under the vehicle-seat. The bracket-lamp described I have found in practical use to be very effective and convenient. The lamp being near the ground, the light is projected in front and close to the ground, where it is most needed, and the lamp is far enough back so as not to be bespattered by mud.

What I claim as my invention, and desire to secure by Letters Patent, is—

1. In a bracket-lamp for vehicles, the combination of a vertical arm provided with an annular head and abutting on the upper end of said arm and hinged thereto a slotted arm having adjustable jaws, substantially as set forth, and for the purpose stated.

2. In a bracket-lamp for vehicles, the combination of the vertical arm having notches and having at its upper end an annular head, the horizontal arm hinged at and abutting on the upper end of said vertical arm and having at one end a slot in which the annular head moves, the fixed jaw on the under side of the horizontal arm, the spring-jaw on the upper side of said arm, the bolt passing through both jaws, and the nut on said bolt, as set forth, and for the purpose stated.

3. In a bracket-lamp for vehicles, the combination of the slotted arm having adjustable jaws, the notched arm having an annular head, the strap connecting said head with the vehicle-body, the hinge connecting said arms, and the hanger attachable to the vehicle, as set forth, and for the purpose stated.

4. In a bracket-lamp for vehicles, the combination of the hinged arms, the adjustable jaws on one of said arms, the annular head, the strap connecting said head with the vehicle, the hanger secured to the vehicle, the lantern provided with a bail supported on the horizontal arm and lying between said arm and said annular head, and the spring secured to said lantern and engaging with notches in the vertical arm, as set forth, and for the purpose stated.

5. In a bracket-lamp for vehicles, the combination of arms at right angles to each other, the adjustable jaws on the horizontal arm, the hanger attachable to the vehicle, the lantern supported by its bail on the horizontal arm, the spring secured to the lantern and inclosing the vertical arm, and the cushion between the lantern and the arm, as set forth, and for the purpose stated.

SOLOMON L. REEFY.

Witnesses:
B. A. TURNER,
GEO. P. HARRINGTON.